(12) United States Patent
Freydina et al.

(10) Patent No.: US 7,846,340 B2
(45) Date of Patent: Dec. 7, 2010

(54) WATER TREATMENT SYSTEM AND METHOD

(75) Inventors: Evgeniya Freydina, Acton, MA (US);
Anil D. Jha, Lincoln, MA (US);
Frederick Wilkins, Pepperell, MA (US);
Aytac Sezgi, Bedford, NH (US);
Reshma Madhusudan, Arlington Heights, IL (US)

(73) Assignee: Siemens Water Technologies Corp., Warrendale, PA (US)

( * ) Notice: Subject to any disclaimer, the term of this patent is extended or adjusted under 35 U.S.C. 154(b) by 686 days.

(21) Appl. No.: 10/712,685

(22) Filed: Nov. 13, 2003

(65) Prior Publication Data
US 2005/0103631 A1    May 19, 2005

(51) Int. Cl.
*C02F 1/46* (2006.01)
*C02F 1/48* (2006.01)

(52) U.S. Cl. .................. 210/744; 204/518; 204/519; 204/542; 204/627; 204/628; 204/648; 204/661; 210/86; 210/87; 210/96.1; 210/97; 210/103; 210/243; 210/257.1; 210/739; 210/746; 210/748

(58) Field of Classification Search .............. 210/87, 210/96.1, 143, 243, 257.1, 739, 746, 748, 210/767, 663, 669, 805, 806, 86, 97, 103, 210/741, 744; 204/518–547, 554–556, 627–643, 204/660, 661, 263, 648
See application file for complete search history.

(56) References Cited

U.S. PATENT DOCUMENTS

| | | |
|---|---|---|
| 2,514,415 A | 7/1950 | Rasch |
| 2,681,319 A | 6/1954 | Bodamer |
| 2,681,320 A | 6/1954 | Bodamer |
| 2,788,319 A | 4/1957 | Pearson |
| 2,794,777 A | 6/1957 | Pearson |
| 2,815,320 A | 12/1957 | Kollsman |

(Continued)

FOREIGN PATENT DOCUMENTS

AU    B-18629/92    10/1992

(Continued)

OTHER PUBLICATIONS

Wood, J.H. et al., "Continuous Electrodeionisation: Module Design Considerations for the Production of High Purity Water," *Proc. of IEX at the Millenium*, Jul. 16, 2000, pp. 44-51.

(Continued)

*Primary Examiner*—Joseph W Drodge
(74) *Attorney, Agent, or Firm*—Lando & Anastasi, LLP

(57) ABSTRACT

A water treatment system provides treated or softened water to a point of use by removing a portion of any hardness-causing species contained in water from a point of entry coming from a water source, such as municipal water, well water, brackish water and water containing foulants. The water treatment system typically treats the water containing at least some undesirable species before delivering the treated water to a point of use. The water treatment system has a reservoir system in line with an electrochemical device. The electrochemical device of the water treatment system is operated at a low current and low flow rate to minimize water splitting or polarization, which minimizes scale formation.

20 Claims, 3 Drawing Sheets

U.S. PATENT DOCUMENTS

| | | | |
|---|---|---|---|
| 2,854,394 A | 9/1958 | Kollsman | |
| 2,912,372 A * | 11/1959 | Stoddard | 204/542 |
| 2,923,674 A | 2/1960 | Kressman | |
| 2,943,989 A | 7/1960 | Kollsman | |
| 3,014,855 A | 12/1961 | Kressman | |
| 3,074,864 A | 1/1963 | Gaysowski | |
| 3,099,615 A | 7/1963 | Kollsman | |
| 3,148,687 A | 9/1964 | Dosch | |
| 3,149,061 A | 9/1964 | Parsi | |
| 3,149,062 A | 9/1964 | Gottschal et al. | |
| 3,165,460 A | 1/1965 | Zang et al. | |
| 3,291,713 A | 12/1966 | Parsi | |
| 3,330,750 A | 7/1967 | McRae et al. | |
| 3,341,441 A | 9/1967 | Giuffrida et al. | |
| 3,375,208 A | 3/1968 | Duddy | |
| 3,627,703 A | 12/1971 | Kojima et al. | |
| 3,630,378 A | 12/1971 | Bauman | |
| 3,645,884 A | 2/1972 | Gilliland | |
| 3,686,089 A | 8/1972 | Korngold | |
| 3,755,135 A | 8/1973 | Johnson | |
| 3,869,375 A | 3/1975 | Ono et al. | |
| 3,869,376 A | 3/1975 | Tejeda | |
| 3,870,033 A | 3/1975 | Faylor et al. | |
| 3,876,565 A | 4/1975 | Takashima et al. | |
| 3,989,615 A | 11/1976 | Kiga et al. | |
| 4,032,452 A | 6/1977 | Davis | |
| 4,033,850 A | 7/1977 | Kedem et al. | |
| 4,089,758 A | 5/1978 | McAloon | |
| 4,102,752 A * | 7/1978 | Rugh, II | 376/317 |
| 4,116,889 A | 9/1978 | Chlanda et al. | |
| 4,119,581 A | 10/1978 | Rembaum et al. | |
| 4,130,473 A | 12/1978 | Eddleman | |
| 4,153,761 A | 5/1979 | Marsh | |
| 4,167,551 A | 9/1979 | Tamura et al. | |
| 4,191,811 A | 3/1980 | Hodgdon | |
| 4,197,206 A | 4/1980 | Karn | |
| 4,216,073 A | 8/1980 | Goldstein | |
| 4,217,200 A | 8/1980 | Kedem et al. | |
| 4,226,688 A | 10/1980 | Kedem et al. | |
| 4,228,000 A | 10/1980 | Hoeschler | |
| 4,294,933 A | 10/1981 | Kihara et al. | |
| 4,298,442 A | 11/1981 | Giuffrida | |
| 4,321,145 A | 3/1982 | Carlson | |
| 4,330,654 A | 5/1982 | Ezzell et al. | |
| 4,358,545 A | 11/1982 | Ezzell et al. | |
| 4,374,232 A | 2/1983 | Davis | |
| 4,430,226 A | 2/1984 | Hedge et al. | |
| 4,465,573 A | 8/1984 | O'Hare | |
| 4,473,450 A | 9/1984 | Nayak et al. | |
| 4,505,797 A | 3/1985 | Hodgdon et al. | |
| 4,574,049 A | 3/1986 | Pittner | |
| 4,614,576 A | 9/1986 | Goldstein | |
| 4,632,745 A | 12/1986 | Giuffrida et al. | |
| 4,636,296 A | 1/1987 | Kunz | |
| 4,655,909 A | 4/1987 | Furuno et al. | |
| 4,661,411 A | 4/1987 | Martin et al. | |
| 4,671,863 A | 6/1987 | Tejeda | |
| 4,687,561 A | 8/1987 | Kunz | |
| 4,702,810 A | 10/1987 | Kunz | |
| 4,707,240 A | 11/1987 | Parsi et al. | |
| 4,747,929 A | 5/1988 | Siu et al. | |
| 4,747,955 A | 5/1988 | Kunin | |
| 4,751,153 A | 6/1988 | Roth | |
| 4,753,681 A | 6/1988 | Giuffrida et al. | |
| 4,770,793 A | 9/1988 | Treffry-Goatley et al. | |
| 4,804,451 A | 2/1989 | Palmer | |
| 4,808,287 A * | 2/1989 | Hark | 210/637 |
| 4,849,102 A | 7/1989 | Latour et al. | |
| 4,871,431 A | 10/1989 | Parsi | |
| 4,872,958 A | 10/1989 | Suzuki et al. | |
| 4,915,803 A | 4/1990 | Morris | |
| 4,925,541 A | 5/1990 | Giuffrida et al. | |
| 4,931,160 A | 6/1990 | Giuffrida | |
| 4,956,071 A | 9/1990 | Giuffrida et al. | |
| 4,964,970 A | 10/1990 | O'Hare | |
| 4,969,983 A | 11/1990 | Parsi | |
| 4,983,267 A | 1/1991 | Moeglich et al. | |
| 5,026,465 A | 6/1991 | Katz et al. | |
| 5,030,672 A | 7/1991 | Hann et al. | |
| 5,066,375 A | 11/1991 | Parsi et al. | |
| 5,066,402 A | 11/1991 | Anselme et al. | |
| 5,073,268 A | 12/1991 | Saito et al. | |
| 5,082,472 A | 1/1992 | Mallouk et al. | |
| 5,084,148 A | 1/1992 | Kazcur et al. | |
| 5,092,970 A | 3/1992 | Kaczur et al. | |
| 5,106,465 A | 4/1992 | Kaczur et al. | |
| 5,116,509 A | 5/1992 | White | |
| 5,120,416 A | 6/1992 | Parsi et al. | |
| 5,126,026 A | 6/1992 | Chlanda | |
| 5,128,043 A | 7/1992 | Wildermuth | |
| 5,154,809 A | 10/1992 | Oren et al. | |
| 5,166,220 A | 11/1992 | McMahon | |
| 5,176,828 A | 1/1993 | Proulx | |
| 5,196,115 A | 3/1993 | Andelman | |
| 5,203,976 A | 4/1993 | Parsi et al. | |
| 5,211,823 A | 5/1993 | Giuffrida et al. | |
| 5,223,103 A | 6/1993 | Kazcur et al. | |
| H1206 H | 7/1993 | Thibodeax et al. | |
| 5,240,579 A | 8/1993 | Kedem | |
| 5,254,227 A | 10/1993 | Cawlfield et al. | |
| 5,259,936 A | 11/1993 | Ganzi | |
| 5,292,422 A * | 3/1994 | Liang et al. | 204/632 |
| 5,308,466 A | 5/1994 | Ganzi et al. | |
| 5,308,467 A | 5/1994 | Sugo et al. | |
| 5,316,637 A | 5/1994 | Ganzi et al. | |
| 5,346,624 A | 9/1994 | Libutti et al. | |
| 5,346,924 A | 9/1994 | Giuffrida | |
| 5,356,849 A | 10/1994 | Matviya et al. | |
| 5,358,640 A | 10/1994 | Zeiher et al. | |
| 5,376,253 A | 12/1994 | Rychen et al. | |
| 5,411,641 A | 5/1995 | Trainham, III et al. | |
| 5,425,858 A | 6/1995 | Farmer | |
| 5,425,866 A | 6/1995 | Sugo et al. | |
| 5,434,020 A | 7/1995 | Cooper | |
| 5,444,031 A | 8/1995 | Hayden | |
| 5,451,309 A | 9/1995 | Bell | |
| 5,458,787 A | 10/1995 | Rosin et al. | |
| 5,460,725 A | 10/1995 | Stringfield | |
| 5,460,728 A | 10/1995 | Klomp et al. | |
| 5,489,370 A | 2/1996 | Lomasney et al. | |
| 5,503,729 A | 4/1996 | Elyanow et al. | |
| 5,518,626 A | 5/1996 | Birbara et al. | |
| 5,518,627 A | 5/1996 | Tomoi et al. | |
| 5,536,387 A | 7/1996 | Hill et al. | |
| 5,538,611 A | 7/1996 | Otowa | |
| 5,538,655 A | 7/1996 | Fauteux et al. | |
| 5,539,002 A | 7/1996 | Watanabe | |
| 5,547,551 A | 8/1996 | Bahar et al. | |
| 5,558,753 A | 9/1996 | Gallagher et al. | |
| 5,580,437 A | 12/1996 | Trainham, III et al. | |
| 5,584,981 A | 12/1996 | Turner et al. | |
| 5,593,563 A | 1/1997 | Denoncourt et al. | |
| 5,599,614 A | 2/1997 | Bahar et al. | |
| 5,670,053 A | 9/1997 | Collentro et al. | |
| 5,679,228 A | 10/1997 | Elyanow et al. | |
| 5,679,229 A | 10/1997 | Goldstein et al. | |
| 5,714,521 A | 2/1998 | Kedem et al. | |
| RE35,741 E | 3/1998 | Oren et al. | |
| 5,736,023 A | 4/1998 | Gallagher et al. | |
| 5,759,373 A | 6/1998 | Terada et al. | |
| 5,762,774 A | 6/1998 | Tessier | |
| 5,766,479 A | 6/1998 | Collentro et al. | |
| 5,788,826 A | 8/1998 | Nyberg | |
| 5,804,055 A | 9/1998 | Coin et al. | |

| | | | | | | |
|---|---|---|---|---|---|---|
| 5,814,197 | A | 9/1998 | Batchelder et al. | 2004/0118780 A1 * | 6/2004 | Willman et al. .............. 210/652 |
| 5,837,124 | A | 11/1998 | Su et al. | 2005/0109703 A1 | 5/2005 | Newenhizen |
| 5,858,191 | A | 1/1999 | DiMascio et al. | 2006/0060532 A1 | 3/2006 | Davis |
| 5,868,915 | A | 2/1999 | Ganzi et al. | | | |
| 5,891,328 | A | 4/1999 | Goldstein | FOREIGN PATENT DOCUMENTS | | |
| 5,925,240 | A | 7/1999 | Wilkins et al. | CA | 2316012 A1 | 11/2001 |
| 5,928,807 | A | 7/1999 | Elias | CN | 1044411 A | 8/1990 |
| 5,954,935 | A | 9/1999 | Neumeister et al. | DE | 1 201 055 | 9/1965 |
| 5,961,805 | A | 10/1999 | Terada et al. | DE | 3238280 A1 | 4/1984 |
| 5,980,716 | A | 11/1999 | Horinouchi et al. | DE | 4016000 A1 | 11/1991 |
| 6,017,433 | A * | 1/2000 | Mani .......................... 204/524 | DE | 44 18 812 A1 | 12/1995 |
| 6,056,878 | A | 5/2000 | Tessier et al. | DE | 199 42 347 A1 | 3/2001 |
| 6,099,716 | A | 8/2000 | Molter et al. | EP | 0170895 A2 | 2/1986 |
| 6,103,125 | A | 8/2000 | Kuepper | EP | 0 503 589 A1 | 9/1992 |
| 6,126,805 | A * | 10/2000 | Batchelder et al. .......... 204/630 | EP | 0 621 072 A2 | 10/1994 |
| RE36,972 | E | 11/2000 | Baker et al. | EP | 0 621 072 B1 | 10/1994 |
| 6,146,524 | A | 11/2000 | Story | EP | 0 680 932 A2 | 11/1995 |
| 6,149,788 | A | 11/2000 | Tessier et al. | EP | 0803474 A2 | 10/1997 |
| 6,171,374 | B1 | 1/2001 | Barton et al. | EP | 0 870 533 A1 | 10/1998 |
| 6,187,154 | B1 | 2/2001 | Yamaguchi et al. | EP | 1 068 901 A2 | 1/2001 |
| 6,187,162 | B1 | 2/2001 | Mir | EP | 1068901 A2 | 1/2001 |
| 6,190,528 | B1 | 2/2001 | Li et al. | EP | 1075 868 A2 | 2/2001 |
| 6,190,553 | B1 | 2/2001 | Lee | EP | 1 101 790 A1 | 5/2001 |
| 6,190,558 | B1 | 2/2001 | Robbins | EP | 1 106 241 A1 | 6/2001 |
| 6,193,869 | B1 | 2/2001 | Towe et al. | EP | 1172145 A2 | 1/2002 |
| 6,197,174 | B1 | 3/2001 | Barber et al. | EP | 1222954 A1 | 7/2002 |
| 6,197,189 | B1 | 3/2001 | Schwartz et al. | EP | 1506941 A1 | 2/2005 |
| 6,214,204 | B1 | 4/2001 | Gadkaree et al. | GB | 776469 | 6/1957 |
| 6,228,240 | B1 | 5/2001 | Terada et al. | GB | 877239 | 9/1961 |
| 6,235,166 | B1 | 5/2001 | Towe et al. | GB | 880344 | 10/1961 |
| 6,248,226 | B1 | 6/2001 | Shinmei et al. | GB | 893051 | 4/1962 |
| 6,254,741 | B1 | 7/2001 | Stuart et al. | GB | 942762 | 11/1963 |
| 6,258,278 | B1 | 7/2001 | Tonelli et al. | GB | 1048026 | 11/1966 |
| 6,267,891 | B1 | 7/2001 | Tonelli et al. | GB | 1137679 | 12/1968 |
| 6,274,019 | B1 | 8/2001 | Masahiro | GB | 1 381 681 A | 1/1975 |
| 6,284,124 | B1 | 9/2001 | DiMascio et al. | GB | 1448533 | 9/1976 |
| 6,284,399 | B1 | 9/2001 | Oko et al. | JP | 54-5888 | 1/1979 |
| 6,296,751 | B1 | 10/2001 | Mir | JP | 07-155750 | 6/1995 |
| 6,303,037 | B1 * | 10/2001 | Tamura et al. .............. 210/652 | JP | 07-265865 | 10/1995 |
| 6,365,023 | B1 | 4/2002 | De Los Reyes et al. | JP | 09-253643 | 9/1997 |
| 6,375,812 | B1 | 4/2002 | Leonida | JP | 11-42483 | 2/1999 |
| 6,391,178 | B1 | 5/2002 | Garcia et al. | JP | 2001-79358 | 3/2001 |
| 6,398,965 | B1 | 6/2002 | Arba et al. | JP | 2001-79553 | 3/2001 |
| 6,402,916 | B1 | 6/2002 | Sampson et al. | JP | 2001-104960 | 4/2001 |
| 6,402,917 | B1 | 6/2002 | Emery et al. | JP | 2001-113137 | 4/2001 |
| 6,458,257 | B1 * | 10/2002 | Andrews et al. ............ 204/263 | JP | 2001-113279 | 4/2001 |
| 6,461,512 | B1 | 10/2002 | Hirayama et al. | JP | 2001-113280 | 4/2001 |
| 6,482,304 | B1 | 11/2002 | Emery et al. | JP | 2001-121152 | 5/2001 |
| 6,607,647 | B2 | 8/2003 | Wilkins et al. | JP | 2003094064 | 4/2003 |
| 6,607,668 | B2 | 8/2003 | Rela | JP | 2005007347 | 1/2005 |
| 6,627,073 | B2 | 9/2003 | Hirota et al. | JP | 2005007348 | 1/2005 |
| 6,648,307 | B2 | 11/2003 | Nelson et al. | RO | 114 874 B | 8/1999 |
| 6,649,037 | B2 | 11/2003 | Liang et al. | SU | 216622 | 11/1972 |
| 6,726,822 | B2 | 4/2004 | Garcia et al. | SU | 990256 | 1/1983 |
| 6,733,646 | B2 | 5/2004 | Sato et al. | SU | 1118389 | 10/1984 |
| 6,766,812 | B1 | 7/2004 | Gadini | WO | WO 92/11089 | 7/1992 |
| 6,780,328 | B1 * | 8/2004 | Zhang ....................... 210/663 | WO | WO 95/32052 | 11/1995 |
| 6,783,666 | B2 | 8/2004 | Takeda et al. | WO | WO 95/32791 | 12/1995 |
| 6,808,608 | B2 | 10/2004 | Srinivasan et al. | WO | WO 96/22162 | 7/1996 |
| 6,824,662 | B2 | 11/2004 | Liang et al. | WO | WO 97/25147 | 7/1997 |
| 6,908,546 | B2 * | 6/2005 | Smith ......................... 210/137 | WO | WO 97/46491 | 12/1997 |
| 7,083,733 | B2 * | 8/2006 | Freydina et al. ............. 210/739 | WO | WO 97/46492 | 12/1997 |
| 7,563,351 | B2 * | 7/2009 | Wilkins et al. .............. 204/524 | WO | WO 98/11987 | 3/1998 |
| 7,572,359 | B2 * | 8/2009 | Liang et al. ................. 204/632 | WO | WO 98/17590 | 4/1998 |
| 2001/0003329 | A1 | 6/2001 | Sugaya et al. | WO | WO 98/20972 | 5/1998 |
| 2002/0092769 | A1 | 7/2002 | Garcia et al. | WO | WO 98/58727 A1 | 12/1998 |
| 2003/0080467 | A1 | 5/2003 | Andrews et al. | WO | WO 99/39810 | 8/1999 |
| 2003/0089609 | A1 | 5/2003 | Liang et al. | WO | WO 00/30749 | 6/2000 |
| 2003/0098266 | A1 | 5/2003 | Shiue et al. | WO | WO 00/64325 A2 | 11/2000 |
| 2003/0155243 | A1 | 8/2003 | Sferrazza | WO | WO 00/75082 A1 | 12/2000 |
| 2003/0201235 | A1 | 10/2003 | Chidambaran et al. | WO | WO 01/49397 A1 | 7/2001 |
| 2004/0060823 | A1 * | 4/2004 | Carson et al. ............... 204/627 | WO | WO 02/04357 A1 | 1/2002 |
| 2004/0079700 | A1 | 4/2004 | Wood et al. | | | |

| WO | WO 02/14224 A1 | 2/2002 |
| WO | WO 03/086590 A1 | 10/2003 |

OTHER PUBLICATIONS

Yoran Oren et al., "Studies on Polarity Reversal with Continuous Deionization," *Desalination*, Elsevier Scientific Publishing Co., Amsterdam, NL, vol. 86, No. 2, Jun. 1, 1992, pp. 155-171.

ASTM, "Standard Practice for Calculation and Adjustment of the Langelier Saturation Index for Reverse Osmosis," Designation: D3739-94 (Reapproved 1998), pp. 1-4.

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

Dimascio et al., "Continuous Electrodeionization: Production of High-Purity Water without Regeneration Chemicals," The Electrochemical Society *Interface*, Fall 1998, pp. 26-29.

Dimascio et al., "Electrodiaresis Polishing (An Electrochemical Deionization Process)," date unknown, pp. 164-172.

Dow Chemical, "Dowex Marathon A Ion Exchange Resin," published Dec. 1999, Product Literature reprinted from www.dow.com.

Dow Chemical, "Dowex Marathon A2 Ion Exchange Resin," published Nov. 1998, Product Literature reprinted from www.dow.com.

Dupont Nafion PFSA Products, Technical Information, "Safe Handling and Use of Perfluorosulfonic Acid Products," Feb. 2004. 4 pages.

Farmer et al., Capacitive Deionization of $NH_4ClO_4$ Solutions with Carbon Aerogel Electrodes, *J. Appl. Electro-Chemistry*, vol. 26, (1996), pp. 1007-1018.

FDA, "Guide to Inspections of High Purity Water Systems," printed from www.fda.gov. on Mar. 30, 2004, date unknown.

Ganzi, G.C. et al., "Electrodeionization: Theory and Practice of Continuous Electrodeionization," *Ultrapure Water*, Jul./Aug. 1997, pp. 64-69.

G.J. Gittens et al., "The Application of Electrodialysis to Demineralisation," A.I.Ch.E.-I.Chem.E.Symposium Series No. 9, 1965 (London: Instn chem. Engrs), pp. 79-83.

Glueckauf, "Electro-Deionisation Through a Packed Bed," *British Chemical Engineering*, Dec. 1959, pp. 646-651.

Hobro et al., "Recycling of Chromium from Metal Finishing Waste Waters Using Electrochemical Ion Exchange (EIX)," 1994, pp. 173-183, publication and date unknown.

Jha, Anil D. et al., "CEDI: Selecting the Appropriate Configuration," reprinted from *Power Engineering*, Aug. 2000 edition.

Johnson et al., "Desalting by Means of Porous Carbon Electrodes," *Electrochemical Technology*, vol. 118, No. 3, Mar. 1971, pp. 510-517.

Kedem et al., "EDS—Sealed Cell Electrodialysis," *Desalination*, vol. 46, 1983, pp. 291-299.

Kedem et al., "Reduction of Polarization by Ion-Conduction Spacers: Theoretical Evaluation of a Model System," *Desalination*, vol. 27, 1978, pp. 143-156.

Korngold, "Electrodialysis Process Using Ion Exchange Resins Between Membranes," *Desalination*, vol. 16, 1975, pp. 225-233.

Laktionov, Evgueni Viktorovitch, "Déminéralisation De Solutions Électrolytiques Diluées. Analyse Comparative Des Performances De Differents ProcédéD'Électrodialyse", Directeur de these, Université Montpellier II, Science Et Technique Du Languedoc, 17 Juillet 1998.

Matejka, "Continuous Production of High-Purity Water by Electro-Deionisation," *J. Appl. Chem., Biotechnol.*, vol. 21, Apr. 1971, pp. 117-120.

Pourcelly, Gerald, Conductivity and selectivity of ion exchange membranes: structure-correlations, *Desalination*, vol. 147 (2002) pp. 359-361.

Purolite Technical Bulletin, Hypersol-Macronet™ Sorbent Resins, 1995.

V. Shaposhnik et al., "Demineralization of water by electrodialysis with ion-exchange membranes, grains and nets," *Desalination*, vol. 133, (2001), pp. 211-214.

R. Simons, "Strong Electric Field Effects on Proton Transfer Between Membrane-Bound Amines and Water," Nature, vol. 280, Aug. 30, 1979, pp. 824-826.

R. Simons, "Electric Field Effects on Proton Transfer Between Ionizable Groups and Water in Ion Exchange Membranes," *Electrochimica Acta*, vol. 29, No. 2, 1984, pp. 151-158.

R. Simons, "Water Splitting in Ion Exchange Membranes," Pergamon Press Ltd., 1985, pp. 275-282.

R. Simons, "The Origin and Elimination of Water Splitting in Ion Exchange Membranes During Water Demineralisation by Electrodialysis," *Desalination*, vol. 28, Jan. 29, 1979, pp. 41-42.

USFilter, "H-Series Industrial CDI® Systems," product information, 1998, 4 pgs.

Walters et al., "Concentration of Radioactive Aqueous Wastes," *Industrial and Engineering Chemistry*, Jan. 1955, pp. 61-67.

Warshawsky et al., "Thermally Regenerable Polymerable Polymeric Crown Ethers, II Synthesis and Application in Electrodialysis," pp. 579-584, publication and date unknown.

Cowan, Donald A., et al., Effect of Turbulence on Limiting Current in Electrodialysis Cells, Industrial and Engineering Chemistry, vol. 51, No. 12, pp. 1445-1448, Dec. 1959.

* cited by examiner

WATER TREATMENT SYSTEM AND METHOD

BACKGROUND OF THE INVENTION

1. Field of the Invention

The present invention relates generally to a system and method for treating water and, more particularly, to a water treatment system incorporating an electrochemical device designed and operated to treat water while minimizing water polarization.

2. Description of the Related Art

Hard water can be softened or treated by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ironically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Other systems have been disclosed. For example, Dosch, in U.S. Pat. No. 3,148,687 teaches a washing machine including a water softening arrangement using ion exchange resins. Similarly, Gadini et al., in International Application Publication No. WO00/64325, disclose a household appliance using water with an improved device for reducing the water hardness. Gadini et al. teach a household appliance having a control system, a water supply system from an external source and a softening system with an electrochemical cell.

Electrodeionization (EDI) is one process that may be used to soften water. EDI is a process that removes ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charges and can be operated to cause electrochemical reactions designed to achieve or enhance performance. These devices also include electrically active membranes such as semi-permeable ion exchange or bipolar membranes.

Continuous electrodeionization (CEDI) is a process wherein the primary sizing parameter is the transport through the media, not the ionic capacity of the media. A typical CEDI device includes alternating electroactive semi-permeable anion and cation exchange membranes. The spaces between the membranes are configured to create liquid flow compartments with inlets and outlets. A transverse DC electrical field is imposed by an external power source using electrodes at the bounds of the membranes and compartments. Often, electrode compartments are provided so that reaction product from the electrodes can be separated from the other flow compartments. Upon imposition of the electric field, ions in the liquid are attracted to their respective counter-electrodes. The adjoining compartments, bounded by the electroactive anion permeable membrane facing the anode and the electroactive cation membrane facing the cathode, typically become ionically depleted and the compartments, bounded by the electroactive cation permeable membrane facing the anode and the electroactive anion membrane facing the cathode, typically become ionically concentrated. The volume within the ion-depleting (depleting) compartments and, in some embodiments, within the ion-concentrating (concentrating) compartments, also includes electrically active or electroactive media. In CEDI devices, the media may include intimately mixed anion and cation exchange resins or fibers. The electroactive media typically enhances the transport of ions within the compartments and may participate as a substrate for controlled electrochemical reactions. Electrodeionization devices have been described by, for example, Giuffrida et al. in U.S. Pat. Nos. 4,632,745, 4,925,541 and 5,211,823, by Ganzi in U.S. Pat. Nos. 5,259,936 and 5,316,637, by Oren et al. in U.S. Pat. No. 5,154,809 and by Kedem in U.S. Pat. No. 5,240,579.

SUMMARY OF THE INVENTION

In one aspect, the present invention provides a method of producing treated water. The method can comprise introducing water from a point of entry into an electrochemical device, removing at least a portion of any undesirable species from the water in the electrochemical device while suppressing hydroxyl ion generation to produce treated water, and distributing at least a portion of the treated water to a point of use.

In accordance with one or more embodiments, the present invention provides a method of producing treated water. The method can comprise introducing water from a point of entry into an electrochemical device, applying an electrical current below a limiting current density through the electrochemical device to promote removal of any undesirable species from the water and produce treated water and maintaining the electrical current below the limiting current density.

In accordance with one or more embodiments, the present invention provides a water treatment system. The system comprises a reservoir system fluidly connected to a point of entry, an electrodeioinization device fluidly connected to the point of entry and the reservoir system, a power supply for providing an electrical current to the electrochemical device and a controller for regulating the electrical current below a limiting current density.

In accordance with one or more embodiments, the present invention provides a method of facilitating water treatment. The method can comprise providing a reservoir system fluidly connectable to a point of entry, providing an electrochemical device fluidly connectable to the reservoir system, providing a power supply for providing an electrical current to the electrochemical device and providing a controller for regulating the electrical current below a limiting current density.

Other advantages, novel features and objects of the invention should become apparent from the following detailed description of the invention, when considered in conjunction with the accompanying drawings, which are schematic and are not intended to be drawn to scale. In the figures, each identical or substantially similar component that is illustrated in various figures is represented by a single numeral or notation. For clarity, not every component is labeled in every figure, nor is every component of each embodiment of the invention shown, where illustration is not necessary to allow those of ordinary skill in the art to understand the invention.

BRIEF DESCRIPTION OF THE DRAWINGS

Preferred, non-limiting embodiments of the present invention will be described by way of example and with reference to the accompanying drawings, in which.

DETAILED DESCRIPTION OF THE INVENTION

United States Patent Applications titled WATER TREATMENT SYSTEM AND METHOD by Wilkins et al. and filed on even date herewith; WATER TREATMENT SYSTEM AND METHOD by Jha et al. and filed on even date herewith; WATER TREATMENT SYSTEM AND METHOD by Ganzi et al. and filed on even date herewith; WATER TREATMENT SYSTEM AND METHOD by Freydina et al. and filed on even date herewith; WATER TREATMENT SYSTEM AND METHOD by Wilkins et al. and filed on even date herewith; WATER TREATMENT SYSTEM AND METHOD by Wilkins et al. and filed on even date herewith; and WATER TREATMENT SYSTEM AND METHOD by Jha et al. and filed on even date herewith are hereby incorporated by reference herein.

The present invention is directed to a water treatment system or purification and method for providing treated water in industrial, commercial and residential applications. The treatment system can provide treated or softened water to a point of use by reducing the concentration of or removing at least a portion of any hardness-causing species contained in water from a water source, such as municipal water, well water, brackish water and water containing foulants. Other applications of the system would be in the treatment and processing of foods and beverages, sugars, various industries, such as the chemical, pharmaceutical, food and beverage, wastewater treatments and power-generating industries.

The water treatment system typically receives water from the water source and treats the water containing at least some undesirable species before delivering the treated water to a point of use. A treatment system typically has a reservoir system in line with an electrochemical device such as, but not limited to, an electrodeionization device. The treatment system, in some embodiments of the present invention, further comprises a sensor for measuring at least one property of the water or an operating condition of the treatment system. In other embodiments of the invention, the treatment system also includes a controller for adjusting or regulating at least one operating parameter of the treatment system or a component of the treatment system. The electrochemical device can comprise any apparatus or system that can remove or reduce the concentration of any undesirable species, such as hardness-causing species, from a fluid, such as water. Examples of such devices or systems include an electrodeionization device, an electrodialysis device, as well as a capacitive deionization device.

Figure 1:
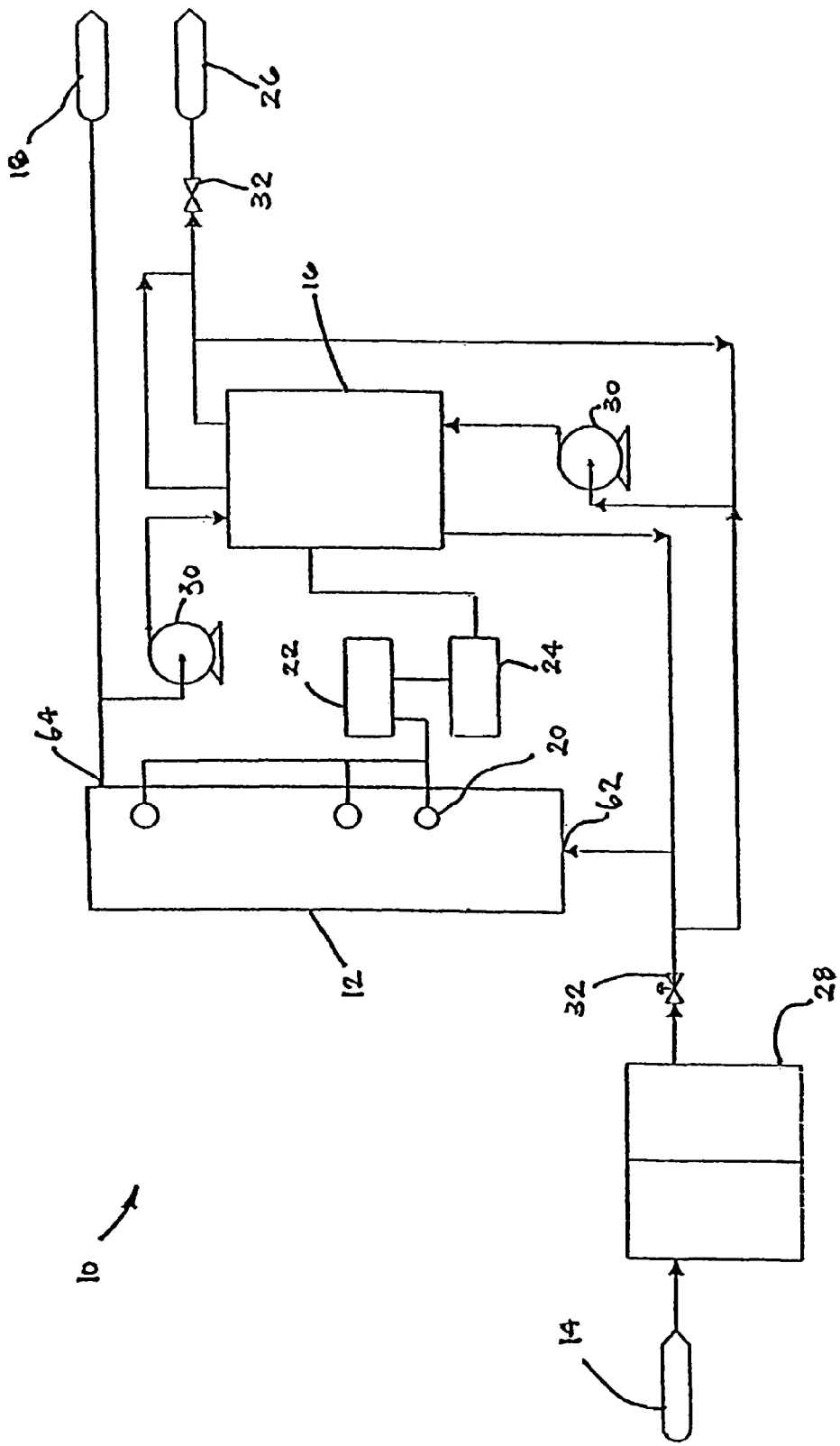
FIG. 1 is a process flow diagram of a water treatment system having a reservoir system and an electrochemical device in accordance with one or more embodiments of the invention.

FIG. 1 shows a schematic flow diagram of a water treatment system according to one embodiment of the present invention. The water treatment system 10 typically includes a reservoir system 12 fluidly connected, typically at an upstream end, to a water source or a point of entry 14 and also to an electrodeionization device 16, typically at a downstream end. Water treatment system 10 typically includes a point of use 18, which is typically fluidly connected downstream of reservoir system 12. In accordance with certain embodiments of the present invention, water treatment system 10 can have a sensor 20 and a controller 22 for controlling or regulating a power source 24 which typically provides power to an electrochemical device such as electrodeionization device 16. Electrodeionization device 16 typically removes undesirable species from water to be treated flowing from point of entry 14 to produce treated water for storage into reservoir system 12 and ultimate delivery to point of use 18. Undesirable species removed by electrodeionization device 16 is typically transferred to an auxiliary use or a drain 26. The auxiliary use can be a utility or service that can utilize the stream containing the undesirable species. For example, the fluid stream carrying the undesirable species can be used in a lawn sprinkler system. However, an auxiliary use is not to be considered as limited to be a fluid stream that is secondary to the treated stream. Thus, in some cases, the concentrate stream may contain the desirable species that was retrieved from the feed stream.

Water treatment system 10, in certain embodiments of the present invention, can further include a pretreatment system 28, which is typically fluidly connected upstream of reservoir system 12 or electrodeionization device 16. Water treatment system 10 typically includes fluid control components, such as manifolds, tees and conduits as well as pump 30 and valve 32.

The present invention will be further understood in light of the following definitions. As used herein, "hardness" refers to a condition that results from the presence of polyvalent cations, typically calcium or magnesium or other metals, in water, that can adversely affects the cleansing capability of the water and the "feel" of the water and may increase the scaling potential of the water. Hardness is typically quantified by measuring the concentration of calcium and magnesium species. In certain embodiments, undesirable species can include hardness ion species.

As used herein, "pressurized" refers to a system or component that has a pressure, internal or applied, that is above atmospheric pressure. For example, a pressurized reservoir system has an internal pressure that is greater than atmospheric pressure. Pressure in the pressurized reservoir system can be created by various methods and techniques, for example, by pressurizing the water with a water pump or by elevating the water source, thus creating head pressure. As used herein, "polarization" refers to the process wherein in water is split to hydrogen or hydronium and to hydroxyl ion species. Water polarization can be effected by providing sufficient energy, for example, by applying an electrical current, specifically, by applying an electrical current above a "limiting current density," which is the current wherein water dissociates. The limiting current density depends on several factors including, among others, the conductivity of the water, the applied voltage, the type of electrodes used, the presence and type of any electroactive media and the ability of such electroactive media to conduct the applied current. Various embodiments in accordance with the present invention have been described in terms of an electrodeionization device. However, other types of electrochemical devices in systems may be utilized in accordance with the systems and techniques of the present invention. Examples of electrochemical devices that may be utilized in accordance with one or more embodiments of the present invention include, but not limited to, electrodeionization devices, electrodialysis devices, and, in some cases, capacitive deionization devices.

Figure 2:
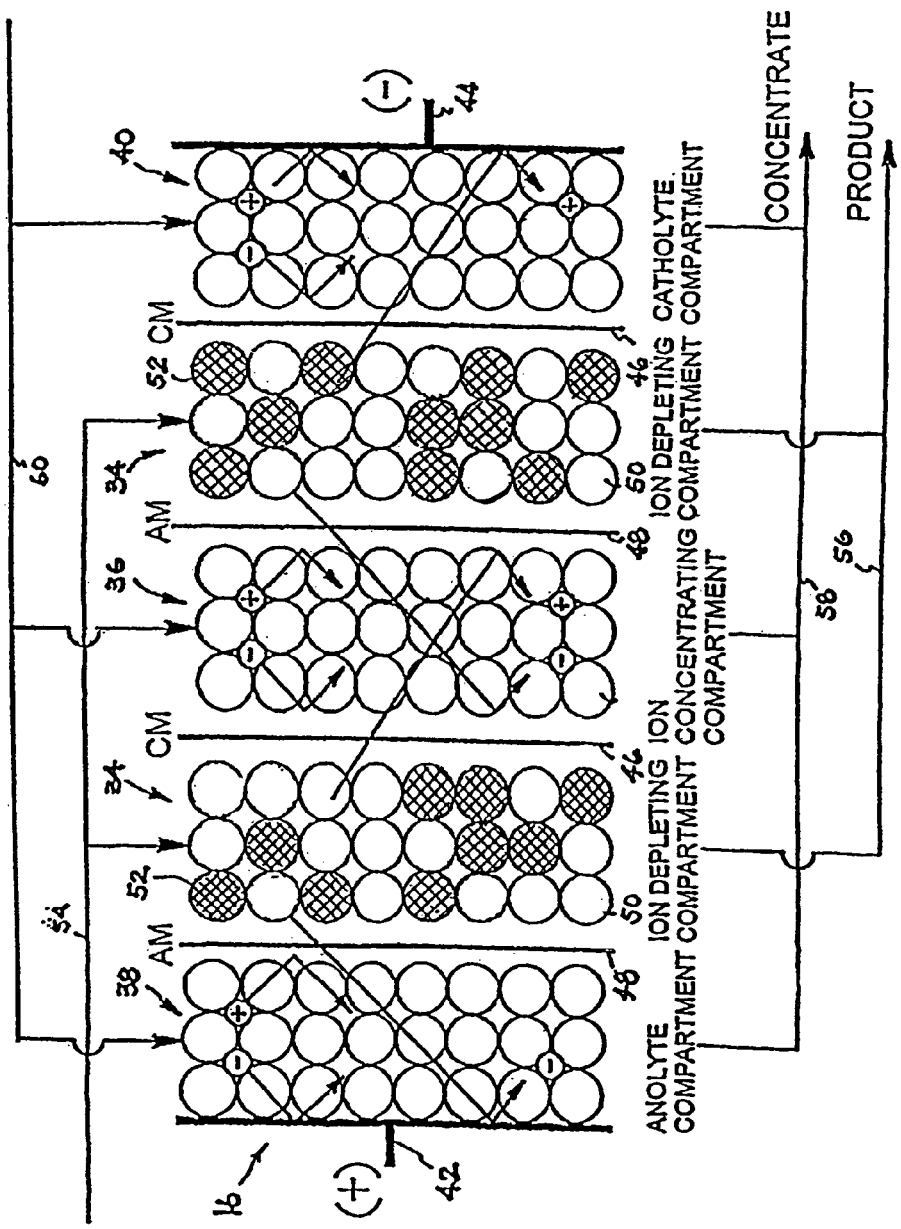
FIG. 2 is a schematic, sectional view through a typical electrodeionization device, illustrating the fluid and ion flow directions through depleting and concentrating compartments in accordance with one or more embodiments of the invention.

FIG. 2 schematically shows a cross-sectional view of some fluid and ion flow paths in one embodiment of an electrodeionization module or device of the present invention. The electrodeionization device 16 includes depleting compartments 34 and concentrating compartments 36, positioned between and adjacent thereto. Depleting compartments 34 are typically bordered by an anolyte compartment 38 and a catholyte compartment 40. Typically, end blocks (not shown) are positioned adjacent to end plates (not shown) to secure an anode 42 and a cathode 44 in their respective compartments. In some cases, the compartments include cation-selective membranes 46 and anion-selective membranes 48, which can peripherally seal both sides of the compartments. The cation-selective membranes and anion-selective membranes are typically comprised of an ion exchange powder, a polyethylene powder binder and a glycerin lubricant. In some embodiments, the cation- and anion-selective membranes are typically heterogeneous polyolefin-based membranes, which are typically extruded by a thermoplastic process using heat and pressure to create a composite sheet. However, other types of membranes may be used including, but not limited to, homogeneous membranes. Representative suitable ion-selective membranes include, for example, web supported using styrene-divinyl benzene with sulphonic acid or quaternary ammonium functional groups, web supported using styrene-divinyl benzene in a polyvinylidene fluoride binder, and unsupported-sulfonated styrene and quarternized vinyl benzyl amine grafts on polyethylene sheet.

Concentrating compartments 36 are typically filled with cation exchange resin 50 and depleting compartments 34 are typically filled with cation exchange resin 50 and anion exchange resin 52. In some embodiments, the cation exchange and anion exchange resins can be arranged in layers within any of the depleting, concentrating and electrode compartments so that a number of layers in a variety of arrangements can be assembled. Other embodiments are believed to be within the scope of the invention including, for example, the use of mixed bed ion exchange resins in any of the depleting, concentrating and electrode compartments, the use of inert resin between layer beds of anionic and cationic exchange resins, the use of various types or arrangements of anionic and cationic resins including, but not limited to, those described by DiMascio et al., in U.S. Pat. No. 5,858,191, which is incorporated herein by reference in its entirety.

In operation, a liquid to be treated 54, typically from an upstream water source entering the treatment system at point of entry 14, having dissolved cationic and anionic components, including hardness ion species, can be introduced into depleting compartments 34, wherein the cationic components are attracted to the cation exchange resin 50 and the anionic components are attracted to the anion exchange resin 52. An electric field applied across electrodeionization device 16, through anode 42 and cathode 44, which are typically positioned on opposite ends of electrodeionization device 16, typically passes perpendicularly relative to the fluid flow direction such that cationic and anionic components in the liquid tend to migrate in a direction corresponding to their attracting electrodes.

Cationic components can migrate through cation-selective membrane 46 into adjacent concentrating compartment 36. Anion-selective membrane 46, typically positioned on the opposite side of concentrating compartment 36, can inhibit migration into adjacent compartments, thereby trapping the cationic components in the concentrating compartment. Similarly, anionic components can migrate through the ion-selective membranes, but in a direction that is opposite relative to the migration direction of the cationic components. Anionic components can migrate through anion-selective membrane 48, from depleting compartment 34, into adjacent concentrating compartment 36. Cation-selective membrane 46, typically positioned on the other side of concentrating compartment 36, can prevent further migration, thus trapping anionic components in the concentrating compartment. In net effect, ionic components can be removed or depleted from the liquid 54 in depleting compartments 34 and collected in concentrating compartments 36 resulting in a treated water product stream 56 and a concentrate or waste stream 58.

In accordance with some embodiments of the present invention, the applied electric field on electrodeionization device 16 can create a polarization phenomenon, which leads to the dissociation of water into hydrogen and hydroxyl ions. The hydrogen and hydroxyl ions can regenerate the ion exchange resins 50 and 52 in depleting compartments 34, so that removal of dissolved ionic components can occur continuously and without a separate step for regenerating exhausted ion exchange resins because of the ionic species migration. The applied electric field on electrodeionization device 16 is typically a direct current. However, any applied electric current that creates a bias or a potential difference between one electrode and another can be used to promote migration of ionic species. Therefore, an alternating current may be used, provided that there is a potential difference between electrodes that is sufficient to attract cationic and anionic species to the respective attracting electrodes. In yet another embodiment of the present invention, an alternating current may be rectified, for example, by using a diode or a bridge rectifier, to convert an alternating current to a pulsating direct current.

Typically, operating voltages above about 1.5 volts/cell pair can effect water polarization. However, other factors may influence the limiting current density including, for example, the type of anion and cation exchange membranes, the type of ion exchange resins, the resin bed depth and the interfacial chemical makeup of the resins and the membranes as explained by Ganzi et al. in *Electrodeionization: Theory and Practice of Continuous Electrodeionization*, Ultrapure Water®, July/August 1997 pp. 64-69 and by Simons, R. in *Electric Field Effects on Proton Transfer Between Ionizable Groups and Water Ion Exchange Membranes*, Electrochimica Acta, vol. 29, no. 2, pp. 151-158 (1984), which are incorporated herein by reference in their entireties. Water splitting also has been discussed by, for example, Zang et al., in U.S. Pat. No. 3,165,460, Batchelder et al., in U.S. Pat. No. 5,503,729, Denoncourt et al., in U.S. Pat. No. 5,593,563, Ganzi et al., in U.S. Pat. No. 5,858,915, Batchelder et al., in U.S. Pat. No. 5,679,228, Goldstein et al., in U.S. Pat. No. 5,679,229, Su et al., in U.S. Pat. No. 5,837,124 and Mir, in U.S. Pat. No. 6,187,162, each of which is incorporated herein by reference in their entireties. In accordance with another embodiment, the present invention provides an electrodeionization device wherein, under an applied electric field, the limiting current density is applied only in the specific compartments so that water is split only in such compartments.

The electroactive media, typically the ion exchange resin beads 50 and 52, typically utilized in depleting compartments 34, can have a variety of functional groups on their surface regions, such as tertiary, alkyl amino groups and dimethyl ethanolamine. These materials can also be used in combinations with ion exchange resin materials having various functional groups on their surface regions, such as quaternary ammonium groups. Electroactive media can be any such component can promote ion-exchange with a fluid and can be as resin beads or fabric or felt.

Reservoir system 12 can serve to store or accumulate water from point of entry 14 or a water source and can also serve to store treated water from product stream 56 from electrodeionization device 16 and also provides water, typically treated water or treated water mixed with water from point of entry 14 to point of use 18 through a distribution system. In one embodiment of the invention, reservoir system 12 can be pressurized with a pressure above atmospheric pressure.

In some embodiments of the present invention, reservoir system 12 comprises a vessel that can have inlets and outlets for fluid flow such as an inlet 62 and an outlet 64. Inlet 62 is typically fluidly connected to point of entry 14 and outlet 64 is typically fluidly connected to a water distribution system or to point of use 18. Reservoir system 12 can have several vessels having several inlets positioned at various locations on each vessel. Similarly, outlet 64 may be positioned on each vessel at various locations depending on, among other things, demand or flow rate to point of use 18, capacity or efficiency of electrodeionization device 16 and capacity or hold-up of reservoir system 12. Reservoir system 12 can further comprise various components or elements that perform desirable functions or avoid undesirable consequences. For example, reservoir system 12 can have vessels having internal components, such as baffle plates, generally referred to as baffles, that are positioned to disrupt any internal flow currents within the vessels of reservoir system 12. Other examples of auxiliary or additional components include, but are not limited to, pressure relief valves designed to relieve internal pressure of any vessels and avoid or at least reduce the likelihood of vessel rupture and thermal expansion tanks that are suitable for maintaining a desired operating pressure. The size and capacity of a thermal expansion tank will depend on factors including, but not limited to, the total volume of water, the operating temperature and pressure of the reservoir system.

In operation, reservoir system 12 is typically connected downstream of point of entry 14 and fluidly connected in-line, such as in a recirculation loop, with electrodeionization device 16. For example, water from point of entry 14 can flow into inlet 62 and can mix with the bulk water contained within reservoir system 12. Bulk water can leave reservoir system 12 through outlet 64 and can be directed to point of use 18 or through pump 30 into electrodeionization device 16 for treating or removal of any undesirable species. Purified water leaving electrodeionization device 16 may mix with water from point of entry 14 and enter reservoir system 12 through inlet 62. In this way, a loop is formed between reservoir system 12 and electrodeionization device 16 and feedwater from point of entry 14 can replenish water demand created by and flowing to point of use 18.

Point of entry 14 can serve to provide water from a water source or to connect the water source to the water treatment system. The water source can be a potable water source, such as municipal water or well water or it can be non-potable, such as a brackish or salt-water source. Typically, an intermediate system purifies the water for human consumption before reaching point of entry 14. The water typically contains dissolved salts or ionic or ionizable species including sodium, chloride, calcium ions, magnesium ions, carbonates, sulfates or other insoluble or semi-soluble species or dissolved gases, such as silica and carbon dioxide. Moreover, the water can contain additives, such as fluoride, chlorate and bromate species.

In another embodiment of the present invention, water treatment system 10 can include a connection to a water distribution system, which in turn connects to a point of use. The water distribution system may comprise components that are fluidly connected to provide water, typically treated water, from reservoir system 12 to point of use 18. The water distribution system may comprise any arrangement of pipes, valves, tees, pumps and manifolds to provide water from reservoir system 12 to one or several points of use 18 or to any component of water treatment system 10. In some embodiments, the present invention provides treated water having a low Langelier Saturation Index (LSI). In other embodiments, the present invention provides treated liquids, such as water, having a low conductivity. As used herein, a low conductivity liquid has a conductivity of less than about 300 μS/cm, preferably less than about 220 μS/cm and more preferably, less than about 200 μS/cm.

Point of use 18 is typically any device or appliance that requires or demands water. For example, point of use 18 can be an appliance, such as a washing machine or a dishwasher, or can be a faucet serving to provide water to a kitchen sink or a showerhead. In another embodiment of the invention, point of use 18 comprises a system for providing water suitable for household or residential use.

In yet another embodiment of the invention, water treatment system 10 also comprises a sensor, typically a water property sensor, which measures at least one physical property of the water in water treatment system 10. For example, sensor 20 can be a device that can measure water conductivity, pH, turbidity, alkalinity, temperature, pressure, flow rate or composition. Sensor 20 can be installed or positioned within water treatment system 10, or any component thereof, to measure a water property or used in combination with one or more sensors to determine the water quality in water treatment system 10. For example, sensor 20 can be a water conductivity sensor installed in reservoir system 12 so that sensor 20 measures the conductivity of the water, which indirectly measures the quality of the water available for service in point of use 18.

In another embodiment of the present invention, water treatment system 10 has multiple sensors, for example, a combination of any of a nephelometer, pH, composition, temperature, pressure and flow rate sensors. The series or set of sensors may be arranged and connected to controller 22 so that the water quality is monitored, intermittently or continuously, through, for example, controller 22, and, in some embodiments, the operation of water treatment system 10 can be optimized, as described below. Other embodiments of the invention can comprise a combination of sets of sensors in various locations throughout water treatment system 10. For example, sensor 20 can be a flow sensor measuring a flow rate to a point of use 18 and further include any of a pH, composition, temperature and pressure sensor monitoring the operating condition of water treatment system 10.

In accordance with another embodiment of the present invention, water treatment system 10 may further comprise a pretreatment system 28 designed to remove a portion of any undesirable species from the water before the water is introduced to, for example, reservoir system 12 or the electrodeionization device 16. Examples of pretreatment systems include, but are not limited to, reverse osmosis devices, which are typically used to desalinate brackish or salt water. Moreover, a carbon or charcoal filter may be used, as necessary, to remove at least a portion of any chlorine or any species that may foul or interfere with the operation of electrodeionization device 16.

Pretreatment system 28 may be positioned anywhere within water treatment system 10. For example, pretreatment system 28 can be positioned upstream of reservoir system 12 or downstream of system 12 but upstream of electrodeionization device 16 so that at least some chlorine species are retained in reservoir system 12 but are removed before the water enters electrodeionization device 16.

In accordance with one or more embodiments of the present invention, water treatment system 10 further comprises a controller 22 that is capable of monitoring and regulating the operating conditions of water treatment system 10 and its components. Controller 22 typically comprises a microprocessor-based device, such as a programmable logic controller (PLC) or a distributed control system that receives or sends input and output signals to components of water treatment system 10. For example, controller 22 can be a PLC that sends a signal to power source 24, which supplies power, typically as an applied electric field, to electrodeionization device 16 or can provide a signal to a motor control center that provides power to pumps 30. In certain embodiments of the invention, controller 22 regulates the operating conditions of water treatment system 10 in open-loop or closed-loop control schemes. For example, controller 22, in open-loop control, can provide signals to the water treatment system such that water is treated without measuring any operating condition. In contrast, controller 22 may control the operating conditions in closed-loop control so that operating parameters may be adjusted depending on a measured operating condition. In yet another embodiment of the invention, controller 22 may further comprise a communication system such as a remote communication device for transmitting or sending any of measured operating condition or operating parameter to a remote station.

Controller 22 may provide a signal that actuates any valves 32 in water treatment system 10 so that fluid flow in water treatment system 10 is adjusted based on a variety of parameters including, but not limited to, the quality of water from point of entry 14, the quality of water to point of use 18, the demand or quantity of water to point of use 18, the operating efficiency or capacity of electrodeionization device 16, or any of a variety of operating conditions, such as the water conductivity, composition, pH, temperature, pressure and flow rate. Thus, in one embodiment of the present invention, controller 22 receives a signal from sensor 20, or a set of signals from a combination of sensors or sets of sensors, so that controller 22 is capable of monitoring the operating parameters of water treatment system 10. For example, sensor 22 can be a water conductivity sensor positioned within reservoir system 12 so that the water conductivity in reservoir system 12 is monitored by controller 22. Controller 22 can, based on the signals from sensor 20, control power source 24 and adjust an electric field to electrodeionization device 16. So, in operation, controller 22 increases, decreases or otherwise adjusts the voltage, current, or both, supplied by power source 24 to electrodeionization device 16.

In accordance with another embodiment of the present invention, controller 22 can calculate or derive a control parameter that can be used to adjust or vary a control signal to a component of the water treatment system. For example, controller 22 can derive a LSI based on, for example, the measured operating conditions of the streams of the water treatment system. The calculated LSI can then be used in another or the same control loop, in the same or another controller, as an input variable that can be compared to a set-point and generate an output signal that actuates, adjusts or otherwise regulates a component of the water treatment system. LSI can be calculated according to, for example, ASTM D 3739. As used herein, low LSI water has a LSI of less than about 2, preferably, less than about 1, and more preferably, less than about zero. If LSI is negative, then there is little or no potential to scale and calcium carbonate readily dissolves; if LSI is positive, then there may be scaling potential and calcium carbonate may precipitate; and if LSI is close to zero, there may be scaling.

In accordance with another embodiment of the present invention, controller 22 may reverse the direction of the applied current from power source 24 to electrodeionization device 16 according to a predetermined schedule or according to an operating condition, such as the water quality or any other operating parameter measured by sensor 20. For example, controller 22 can be configured to reverse the polarity of the current applied to electrodeionization device 16 when a measured parameter reaches a set point. Polarity reversal has been described by, for example, Giuffrida et al., in U.S. Pat. No. 4,956,071, which is incorporated herein by reference in its entirety.

Controller 22 can be configured by programming or may be self-adjusting such that it is capable of maximizing any of the service life and the efficiency or reducing the operating cost of water treatment system 10. For example, controller 22 can comprise a microprocessor having user-selectable set points or self-adjusting set points that adjusts the applied voltage and current to electrodeionization device 16, the flow rate through the concentrating and depleting compartments of the electrodeionization device or the flow rate to discharge or drain 26 from the electrodeionization device or the pretreatment system or both. Controller 22 can incorporate dead band control to reduce the likelihood of unstable on/off control or chattering. Dead band refers to the range of signal outputs that a sensor provides without necessarily triggering a responsive control signal. The dead band may reside, in some embodiments, intrinsically in the sensor or may be programmed as part of the control system, or both. Dead band control can avoid unnecessary intermittent operation by smoothing out measurement excursions. Such control techniques can prolong the operating life or mean time before failure of the components of water treatment system 10. Other techniques that can be used include the use of voting, time-smoothing or time-averaging measurements or combinations thereof.

In some embodiments of the present invention, the water treatment system stores water from point of entry 18, which is typically connected to a water source, typically at a pressure above atmospheric pressure, in a first zone of reservoir system 12. Reservoir system 12 can be fluidly connected to a water distribution system that supplies the treated water to point of use 18. Water treatment system 18 can also have an electrochemical device 16 that treats water from point of entry 14 by removing at least a portion of any undesirable species to produce treated water that is introduced to and preferably stored in a second zone of reservoir system 12. First and second zones of reservoir system 12 can be monitored by at least one water quality sensor, preferably, a set of water quality sensors connected to controller 22, which, in turn, can adjust an operating parameter of electrochemical device 16. In this way, controller 22 can monitor the first and second zones of reservoir system 12 and regulate the operation of electrochemical device 16 depending on any of the properties measured by a sensor 20 which can measure the water properties of the water in the first and second zones.

In another embodiment of the present invention, controller 22, through sensor or set of sensors 20 or combinations thereof, can monitor or measure at least one water property of the water in the first and second zones of reservoir system 12 and also measures a flow rate flowing into at least one point of use 18 and adjusts an operating parameter of electrochemical device 16 based on the measured properties. Thus, in one embodiment of the invention, sensor 20 measures at least one property of at least one of the water from the point of entry and the treated water and adjusts controller 22 valve and pumps to, accordingly, provide appropriate water quality to point of use 18. For example, when an increased flow rate is measured to point of use 18, controller 22 adjusts an operating parameter of electrochemical device 16 to treat water to compensate for additional demand flowing into point of use 18. In another example, controller 22 can adjust an operating parameter of electrochemical device 16 depending on the volume in the first and second zones of reservoir system 12 and the historical demand required by point of use 18.

In another embodiment of the present invention, controller 22 can be configured to regulate the applied electric field produced by the power supply such that the applied voltage and the applied current is maintained at a level that does not or at least minimizes water splitting in electrochemical device 16. Thus, for example, controller 22 can be configured to regulate the power supply to produce an applied voltage and current below the limiting current density based on, among other factors, the flow rate and conductivity of the water to be treated, the size, shape and configuration of the ion exchange compartments, the size, shape, arrangement and composition of the electrodes and the type and arrangement of the ion exchange resin used. Accordingly, according to some embodiments of the invention, the applied electric field can be regulated to be maintained at below the limiting current density by, for example, constructing the electrochemical device with pre-selected components in conjunction with the controller and a power supply. For example, the power supply may be configured to have a maximum voltage or current, which, in combination with the ion exchange compartment size and shape, the electrode composition, size and shape and the type of ion exchange resin, would not create conditions that split water.

In another embodiment of the present invention, reservoir system 12 can have partitions that can separate treated water from untreated water or mixtures of treated water with untreated water. Controller 22, through measurement sensors 20 and valves 32, can control the flow of treated, raw or mixed water to a particular point of use, depending on specific needs of that point of use. For example, if point of use 18 requires softened water, then controller 22 would open valves 32 in the water distribution system so that only treated water is provided to point of use 18. Or, if point of use 18 does not require softened water, then controller 22 would isolate the treated water in reservoir system 12 and allow raw water to flow through the water distribution system to point of use 18 by opening the appropriate valves.

In another embodiment of the present invention, reservoir system 12 has zones of predominantly treated water that can be isolated from zones of predominantly raw water by the use of partitions or baffles or by the use of separate vessels. In such arrangements, controller 22 can control valves 32 so that raw water is introduced into electrochemical device 16 and treated water from the electrochemical device can be transferred to the appropriate zone or vessel.

Controller 22 can supply water to point of use 18 depending on the requirements of point of use 18 in a similar fashion as described above. Thus, in another embodiment, the volumes of the first and second zones can be adjusted depending on several factors including, for example, the demand from a point of use, the operating efficiency of the electrochemical device and the water property of the water in the zones. Controller 22 can regulate the operation of the water treatment system by incorporating adaptive or predictive algorithms, which are capable of monitoring demand and water quality and adjusting the operation of the electrodeionization device, such as increasing or decreasing the applied voltage or the period between current reversals of electrodeionization device 16. Controller 22 can be predictive by anticipating higher demand for treated water during early morning hours in a residential application to supply point of use 18 serving as a showerhead.

Controller 22 can incorporate dead band control to reduce the likelihood of unstable on/off control or chattering. Dead band refers to the range of signal outputs that a sensor provides without necessarily triggering a responsive control signal. The dead band may reside, in some embodiments, intrinsically in the sensor or may be programmed as part of the control system, or both. Dead band control can avoid unnecessary intermittent operation by smoothing out measurement excursions. Such control techniques can prolong the operating life or mean time before failure of the components of water treatment system 10. Other techniques that can be used include the use of voting, time-smoothing or time-averaging measurements or combinations thereof.

In accordance with another embodiment of the present invention, water, typical from waste stream 58, to auxiliary use can serve or provide additional or secondary benefits. For example, waste stream 58, rather than going to drain 26, may be used to provide irrigating water to a residential, commercial or industrial application. Alternatively, the concentrate stream may be introduced into a unit operation that retrieves the dissolved species.

The present invention may be further understood through the following example, which is illustrative in nature and is not intended to limit the scope of the invention. The present invention has been described using water as the liquid but should not be limited as such. Where reference is made to treated water, it is believed that other fluids can be treated in the system or according to the method of the present invention. Where reference is made to a component of the system or to the method of the present invention that adjusts, modifies, measures or operates on water or water property, the present invention is believed to be applicable as well. Thus, the fluid to be treated may be a fluid that is a mixture comprising water. Accordingly, the fluid can be a liquid that comprises water.

EXAMPLE

Figure 3:
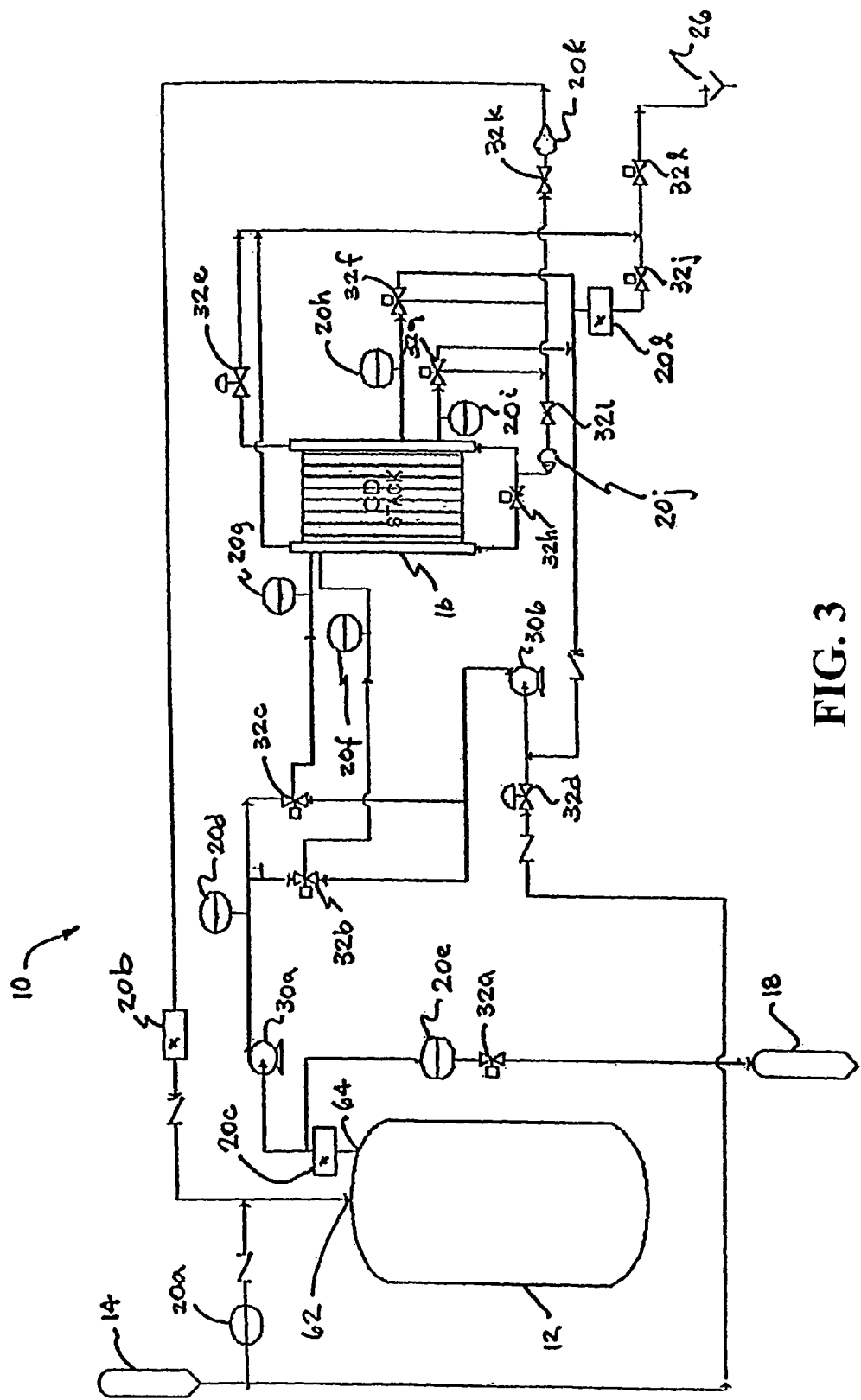
FIG. 3 is a schematic flow diagram of a water treatment system in accordance with one or more embodiments of the invention and as described in the Example.

FIG. 3 is a schematic flow diagram of a water treatment system built, operated, and evaluated according to one or more embodiments of the present invention. The water treatment system 10 had a reservoir system 12, which comprised a vessel 13 with an inlet 62 and an outlet 64. Inlet 62 was fluidly connected to a point of entry 14 through which water to be treated was introduced. Outlet 64 was fluidly connected to a point of use 18 through a distribution system (not shown). Water treatment system 10 also had an electrodeionization module 16.

Water, from point of entry 14, was introduced into reservoir system 12 and was re-circulated through electrodeionization module 16. The water treatment system was controlled by a programmable controller (not shown) based on the measured water conductivity, as measured by sensors 20b and 20c, upstream of an inlet 62 and downstream of an outlet 64 of pressurized vessel 12. The flow rate to reservoir system 12 was monitored by sensor 20a. Electrodeionization device 16 was comprised of a 10-cell pair stack with about 7½-inch flow paths. Each cell was filled with AMBERLITE® SF 120 resin and AMBERLITE® IRA 458 resin, both available from Rohm & Haas Company, Philadelphia, Pa.

Electrodeionization device 16 used an expanded titanium electrode coated with ruthenium oxide. Vessel 12 was a 10-inch diameter fiberglass vessel with about a 17-gallon capacity. The concentrate stream leaving electrodeionization device 16 was partially circulated and partially rejected to a drain 26 by regulating valves 32b, 32c, 32e, 32f, 32g, 32h, 32j and 32l. Treated water was returned to vessel 12 by regulating valves 32k, 32g and 32f. Fluid flow to the electrode compartments was controlled by actuating valves 32i, 32h and 32e. Make-up water, from point of entry 14, was fed into the re-circulating stream to compensate for waste rejected to drain 26 by regulating valves 32b, 32c and 32d in proper sequence. The flow rate of treated water to a point of use 18 from outlet 64 of vessel 13 was regulated by adjusting valve 32a. Several sensors measuring operating conditions and water properties were installed throughout water treatment system 10 including pressure indicators 20d, 20f, 20g, 20h and 20i, flow rate indicators 20a, 20e, 20j and 20k and conductivity sensors 20b, 20c and 20l. The controller was a MicroLogix™ 1000 programmable controller available from Allen-Bradley Company, Inc., Milwaukee, Wis. The electrodeionization device was set to start up by a flow switch signal or when the water conductivity of the outlet stream leaving the pressurized vessel reached a set point. The feed from the electrodeionization device was re-circulated through vessel 13 and electrodeionization device 16 via a second feed pump. In operation, each sensor 20b, 20c and 20l provided a signal to a controller (not shown), which corresponds to the measured water conductivity.

Electrodeionization device 16 was operated under a normal applied current and a reduced current. Table 1 shows the operating and performance of the electrodeionization device under the normal and reduced current operating parameters. The direction of the applied electrical current was reversed for each flow rate test run. The efficiency of the electrodeionization device was empirically determined based on the removal rate, which is calculated by measuring the conductivity difference between the in outlet and inlet or feed streams relative to the inlet conductivity.

Table 1 shows that the efficiency of the electrodeionization device at the higher flow rate/higher applied current was comparable to the efficiency at the lower flow rate/lower applied current. However, the measured LSI of the stream flowing through the cathode compartment was significantly lower when the electrodeionization device was operated at the lower flow rate/lower applied current conditions. LSI can provide an indication of the degree of saturation of water, with respect to calcium carbonate, and can be used to predict whether scaling will occur. LSI can be related to the driving force for scale formation and depends on, at least, the pH, total alkalinity, calcium hardness, temperature and total dissolved solids in the fluid.

Table 1 also shows that the stream flowing through the cathode compartment, when the electrodeionization device was operated at the lower current, at a current that was below the limiting current density, had a lower likelihood of scaling, as measured by the LSI, without any loss in operating efficiency, as measured by the removal rate. The system operated at the lower flow rate, about 0.02 liter per minute per cell, with a lower applied voltage and current, produced water that was comparable in quality compared to the system operated at the higher flow rate and applied voltage and current.

TABLE 1

Operating Conditions of the electrodeionization device for well water.

| Flow rate (liter per minute per cell) | Applied Voltage (V) | Applied Current (Amp) | Conductivity at Inlet (μS/cm) | Conductivity at Outlet (μS/cm) | Removal (%) | LSI |
|---|---|---|---|---|---|---|
| 0.04 | 40 | 0.46 | 785 | 134 | 83 | 1.0 |
|  | 40 | 0.44 | 754 | 139 | 82 |  |
| 0.04 | 40 | 0.46 | 809 | 156 | 81 | 1.19 |
|  | 40 | 0.40 | 801 | 209 | 74 |  |
| 0.02 | 20 | 0.22 | 725 | 120 | 83 | 0.02 |
|  | 19 | 0.20 | 710 | 112 | 84 |  |
| 0.02 | 19 | 0.22 | 824 | 165 | 80 | 0.01 |

TABLE 1-continued

Operating Conditions of the electrodeionization device for well water.

| Flow rate (liter per minute per cell) | Applied Voltage (V) | Applied Current (Amp) | Conductivity at Inlet (μS/cm) | Conductivity at Outlet (μS/cm) | Removal (%) | LSI |
|---|---|---|---|---|---|---|
|  | 19 | 0.23 | 821 | 158 | 81 |  |

Those skilled in the art should appreciate that all parameters and configurations described herein are meant to be exemplary and that actual parameters and configurations will depend upon the specific application in which the systems and methods of the present invention are used. Those skilled in the art should recognize, or be able to ascertain, using no more than routine experimentation, many equivalents to the specific embodiments of the invention described herein. For example, those skilled in the art may recognize that the present invention can be configured to treat the same quantity of water by using two or more electrodeionization devices operating at a lower flow rate/lower current rather than one larger electrodeionization device at a higher flow rate/higher current or that the present invention may include various configurations relevant to providing water to a residential facility. It is, therefore, to be understood that the foregoing embodiments are presented by way of example only and that, within the scope of the appended claims and equivalents thereto, the invention may be practiced otherwise than as specifically described. The present invention is directed to each feature, system, or method described herein. In addition, any combination of two or more features, systems or methods, if such features, systems or methods are not mutually inconsistent, is considered to be within the scope of the present invention.

What is claimed is:

1. A method of producing treated water comprising:
   introducing a first portion of water to be treated from a point of entry into a pressurized vessel while introducing a second portion of the water to be treated from the point of entry into an electrochemical device;
   removing at least a portion of any undesirable species from the second portion of the water to be treated in the electrochemical device while suppressing hydroxyl ion generation to produce treated water;
   storing at least a portion of the treated water in a treated water zone of the pressurized vessel, the treated water zone of the pressurized vessel defined by at least one baffle separating the treated water from an untreated water zone containing water not treated by the electrochemical device;
   distributing at least a portion of the water from the pressurized vessel to a point of use in a household; and
   controlling at least one operating parameter of the electrochemical device depending upon volume of water in the treated water zone and volume of water in the untreated water zone of the vessel.

2. The method of claim 1, wherein removing the at least a portion of any undesirable species while suppressing hydroxyl ion generation comprises applying an electrical current below a limiting current density.

3. The method of claim 1, further comprising measuring at least one water property of at least a portion of the water in the pressurized vessel.

4. The method of claim 3, further comprising adjusting an operating parameter of the electrochemical device based on the measured water property.

5. The method of claim 3, further comprising distributing at least a portion of the treated water to a point of use based on the measured water property.

6. The method of claim 3, further comprising adjusting a flow rate of the water into the electrochemical device based on the measured water property.

7. The method of claim 1, wherein the electrochemical device comprises an electrodeionization device.

8. The method of claim 7, further comprising measuring a plurality of water quality levels of the water in the vessel.

9. A method of producing treated water comprising introducing a portion of water to be treated from a point of entry into a first zone of a vessel;
introducing a portion of the water from the vessel into the electrodeionization device; applying an electrical current below through the electrodeionization device to promote removal of any undesirable species from the water and produce treated water; and
introducing at least a portion of the treated water from the electrodeionization device into a second zone of the vessel, the second zone separated from the first zone by at least one baffle; and
controlling at least one operating parameter of the electrodeionization device depending upon volume of water in the treated, second water zone and volume of water in the untreated, first water zone of the vessel.

10. The method of claim 9, further comprising measuring a water property of water in the vessel.

11. The method of claim 10, wherein applying the electrical current comprises adjusting the electrical current based on the measured water property.

12. The method of claim 11, wherein introducing water from the point of entry into the first zone of the vessel comprises adjusting a water flow rate based on the measured water property.

13. The method of claim 12, further comprising distributing at least a portion of the treated water to a household point of use.

14. A water treatment system comprising:
a water storage vessel fluidly connected to a point of entry, the water storage vessel comprising a plurality of zones having water contained therein with differing water quality levels;
an electrochemical device fluidly connected to the point of entry and the water storage vessel, the water storage vessel containing at least one baffle and fluidly coupled to the electrochemical device so as to define at least two of the zones of differing water quality levels such that at least one zone contains water which has been treated by the electrochemical device and at least one zone contains water which has not been treated by the electrochemical device;
a power supply for providing an electrical current to the electrochemical device; and
a controller system for regulating the electrical current below a limiting current density and operable for controlling at least one operating parameter of the electrodeionization device depending upon volume of water in a treated water zone and volume of water in an untreated water zone of the vessel.

15. The system of claim 14, further comprising a household distribution system fluidly connected downstream of the water storage vessel and to a point of use.

16. The system of claim 14, further comprising at least one water property sensor.

17. The system of claim 16, wherein the electrochemical device comprises an electrodeionization device.

18. The system of claim 14, wherein at least a portion of the water storage vessel is pressurized.

19. The system of claim 18, wherein the controller is further configured to regulate delivery of water from at least one of the plurality of zones to at least one point of use.

20. The system of claim 14, wherein the controller is further configured to receive at least one signal representative of at least one water quality level of at least one zone and regulate the electrical current based at least partially on the at least one signal.

* * * * *

UNITED STATES PATENT AND TRADEMARK OFFICE
CERTIFICATE OF CORRECTION

| | | |
|---|---|---|
| PATENT NO. | : 7,846,340 B2 | Page 1 of 1 |
| APPLICATION NO. | : 10/712685 | |
| DATED | : December 7, 2010 | |
| INVENTOR(S) | : Evgeniya Freydina et al. | |

It is certified that error appears in the above-identified patent and that said Letters Patent is hereby corrected as shown below:

IN THE CLAIMS:

In column 15, line 19, claim 9, delete "below."

Signed and Sealed this
Seventh Day of August, 2012

David J. Kappos
*Director of the United States Patent and Trademark Office*